US009386073B2

(12) United States Patent
Ohkawa

(10) Patent No.: US 9,386,073 B2
(45) Date of Patent: Jul. 5, 2016

(54) TECHNIQUES FOR PERFORMING PROCESSING FOR DATABASE

(71) Applicant: International Business Machines Corporation, Armonk, NY (US)

(72) Inventor: Masahiro Ohkawa, Kashiwa (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 386 days.

(21) Appl. No.: 13/969,980

(22) Filed: Aug. 19, 2013

(65) Prior Publication Data

US 2014/0052826 A1 Feb. 20, 2014

(30) Foreign Application Priority Data

Aug. 20, 2012 (JP) ................................. 2012-181880

(51) Int. Cl.
| | |
|---|---|
| *G06F 15/16* | (2006.01) |
| *H04L 29/08* | (2006.01) |
| *G06F 11/20* | (2006.01) |
| *G06F 11/14* | (2006.01) |
| *H04L 29/14* | (2006.01) |

(52) U.S. Cl.
CPC ............ *H04L 67/02* (2013.01); *G06F 11/1471* (2013.01); *G06F 11/20* (2013.01); *G06F 11/2023* (2013.01); *G06F 11/2046* (2013.01); *H04L 69/40* (2013.01); *G06F 11/1443* (2013.01); *G06F 11/2035* (2013.01); *G06F 2201/80* (2013.01); *G06F 2201/82* (2013.01); *G06F 2201/825* (2013.01)

(58) Field of Classification Search
CPC ................................ G06F 11/20; H04L 67/02
USPC ................... 709/219, 220, 224, 232; 711/166
See application file for complete search history.

(56) References Cited

U.S. PATENT DOCUMENTS

| | | | |
|---|---|---|---|
| 6,594,667 B2 * | 7/2003 | Dahlen | ............. G06F 17/30312 |
| 7,103,619 B1 * | 9/2006 | Rajpurkar | ......... G06F 17/30578 |
| 7,433,903 B1 * | 10/2008 | Shapiro | ............... G06F 11/2071 |

(Continued)

FOREIGN PATENT DOCUMENTS

| | | |
|---|---|---|
| JP | 05334163 A | 12/1993 |
| JP | 08016444 A | 1/1996 |
| JP | 08235039 A | 9/1996 |

(Continued)

*Primary Examiner* — Khanh Dinh
(74) *Attorney, Agent, or Firm* — Cantor Colburn LLP

(57) ABSTRACT

Embodiments relate to a method, system and program product for performing data processing. The system includes a plurality of computer servers configured to perform data processing, a client in processing communication with the computer servers and enabled to request data processing from any of the servers and a storing component included in the client for storing information relating to requested data to be processed. A processing component included in each computer server for applying a control lock to data being processed. A reprocessing request component is included in the client for enabling a new server to take over processing of requested data upon failure of previously processing computer server. The computer server obtains information relating to requested data from storing component and information relating to control lock information from the processing component such that the new computer server commences processing at a processing point exactly prior to the failure.

20 Claims, 9 Drawing Sheets

(56) References Cited

U.S. PATENT DOCUMENTS

| | | | |
|---|---|---|---|
| 8,239,649 B2 * | 8/2012 | Gainey, Jr. | G06F 9/30003 711/166 |
| 2013/0205108 A1 * | 8/2013 | Perelstein | G06F 11/1492 711/162 |

FOREIGN PATENT DOCUMENTS

| | | |
|---|---|---|
| JP | 2003036196 A | 2/2003 |
| JP | 2004086543 A | 3/2004 |
| JP | 2005004754 A | 1/2005 |
| JP | 2005250998 A | 9/2005 |

* cited by examiner

TECHNIQUES FOR PERFORMING PROCESSING FOR DATABASE

PRIORITY

The present application claims priority to Japanese Patent Application number 2012-181880 filed Aug. 20, 2012 and all benefits accruing therefrom under U.S.C. §119, the contents of which is incorporated herein by reference in its entirety.

BACKGROUND

The present disclosure relates generally to database processing techniques and more specifically to techniques for database processing initiated by a client in a multi-server environment.

Conventional database systems in multi-server environments provide the advantage of providing continuous operations. This means that in case of catastrophic failures or one or more servers, other available servers in the environment can still continue operating. Nonetheless, despite the availability of continuous operation, any operation, task or transaction that was being performed by one of the failed servers will not be completed. In such instances, the operation or task may have to be reinitiated by a new server and any data obtained may be affected or lost. In other words, once the server fails prior to the completion of an operation, task or transaction, the transaction and related data will be rolled back.

Rolling back of the transaction can cause data integrity and performance issues in some instances. For example, in operations such as those using structured query language (SQL), a user must reissue the same SQL statement to start the operation and the same SQL statement will be also be issued automatically during a rolled back transaction. However, this causes more than redundancy concerns. In instances when the same SQL statement has to be reissued, there is a possibility that the consistency of the data that is the subject of the SQL statement will be lost. When the transaction updates the data, a lock is applied to the data, but the lock on the data is released by the rollback operation. Therefore data is likely to be updated by another unrelated transaction prior to reissuance of the same SQL for the original transaction. One example can add more clarity. In this example, a person is reserving an airline seat, but before the completion of the transaction, the person receives an error notification that the transaction has failed. When the person tries to reserve the same seat again, the system indicates that the seat has already been taken and reserved by another person. These types of problems, therefore, need to be taken into account and minimized to achieve an optimal system.

SUMMARY

Embodiments relate to a method, system and program product for performing data processing. The system includes a plurality of computer servers configured to perform data processing, a client in processing communication with the computer servers and enabled to request data processing from any of the servers and a storing component included in the client for storing information relating to requested data to be processed. A processing component included in each computer server for applying a control lock to data being processed. In addition, a reprocessing request component included in the client for enabling a new server to take over processing of requested data upon failure of previously processing computer server, wherein the new computer server obtains information relating to requested data from storing component and information relating to control lock information from the processing component such that the new computer server commences processing at a processing point exactly prior to the failure.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
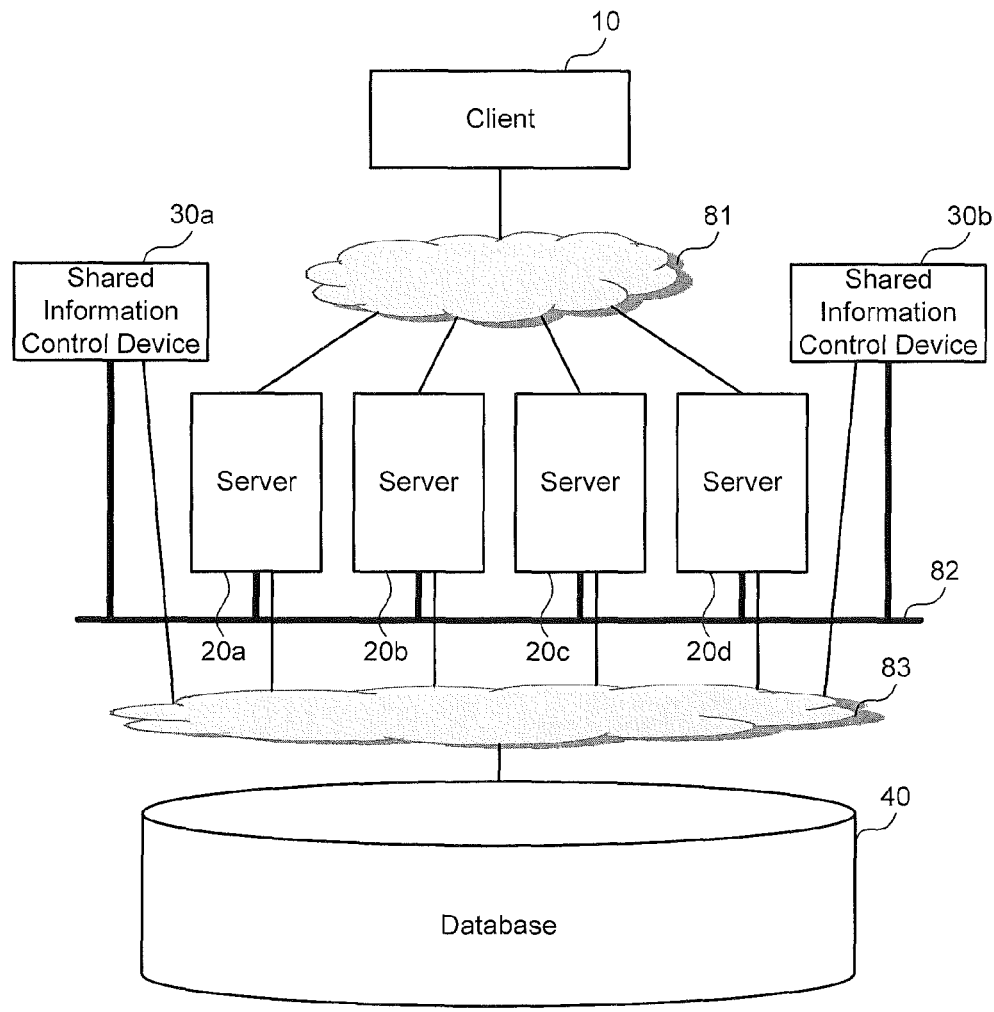
FIG. 1 depicts a block diagram illustrating an example of a configuration of a database system in accordance to one embodiment.

FIG. 1 is a block diagram illustrating an example of a configuration of a database system according to one embodiment. As illustrated in the figure, the database system includes a client 10, servers 20*a*, 20*b*, 20*c*, 20*d*, shared information control devices 30*a*, 30*b*, and a database 40. Furthermore, the client 10 and the servers 20*a*, 20*b*, 20*c*, 20*d*, are connected by a network 81. The servers 20*a*, 20*b*, 20*c*, 20*d* can share information through control devices 30*a*, 30*b* which are all connected by a first network 82. The database 40 is connected to the servers 20*a*, 20*b*, 20*c*, 20*d* and the common information control devices 30*a*, 30*b* by a second network 83.

In one embodiment, the client 10 is a computer that connects to one of the servers 20*a*, 20*b*, 20*c*, 20*d*, and issues a structured query language (SQL) statement that operates a database 40 to the connected server. Furthermore, the client 10 has a function that determines a connection destination from among the servers 20*a*, 20*b*, 20*c*, 20*d* based on load information received therefrom so that load balancing is achieved. The client 10 has also a function that determines the connection destination when a fault occurs in any one of these servers 20a, 20b, 20c, 20d, based on the load information. Alternatively, the client 10 determines the connection destination from among the servers 20a, 20b, 20c, 20d, based on an explicit indication. Herein, the client 10 may be a desktop PC (personal computer), notebook PC, Tablet PC, PDA (personal digital assistant), smart phone, cellular phone, or the like.

The servers 20a, 20b, 20c, 20d share a database 40, and each of the servers is a computer with a function that accesses the database 40 using an SQL statement issued by the client 10. The servers 20a, 20b, 20c, 20d are configured so as to provide uniform access to the database 40. Note that, in the diagram, the servers 20a, 20b, 20c, 20d are separately shown, but when individual distinguishing is not necessary, the servers are collectively referred to as server 20. Furthermore, in the diagram, four servers 20 are illustrated, but two, three, or five or more servers 20 may be provided.

The shared information control devices 30a, 30b are devices that control information shared among the servers 20a, 20b, 20c, 20d. Herein, the shared information refers to, for example, information related to data locks in the database 40 (hereinafter referred to as "lock information"), usage status of transaction identification information that is unique in the database system (hereinafter referred to as "transaction ID"), and the like. Note that the shared information control devices 30a, 30b are synchronously duplicated in which the shared information control device 30a functions as a primary shared information control device, and the shared information control device 30b functions as a secondary shared information control device when a fault occurs in the shared information control device 30a. However, in the description below, it is assumed that no fault occurs in the shared information control device 30a and only the device 30a is used as a shared information control device. The database 40 is shared by the servers 20a, 20b, 20c, 20d, and stores data to be processed when the client 10 issues an SQL statement.

The network 81 is communication means used for information communication between the client 10 and the servers 20a, 20b, 20c, 20d, which may be the Internet. The network 82 is communication means for high-speed data communication between the servers 20a, 20b, 20c, 20d and the shared information control devices 30a, 30b. Herein, an example of the network 82 is an Infiniband® that utilizes an RDMA (Remote Direct Memory Access) function to directly access the memory of the servers 20 and the shared information control devices 30. The network 83 is communicating means that is used for information communication between the servers 20a, 20b, 20c, 20d, the shared information control devices 30a, 30b, and the database 40, which may be a SAN (Storage Area Network). First, a general operation of this type of database system is described. Note that a unit of reading data stored in the database 40 into a cache is referred to as "page".

Figure 2:
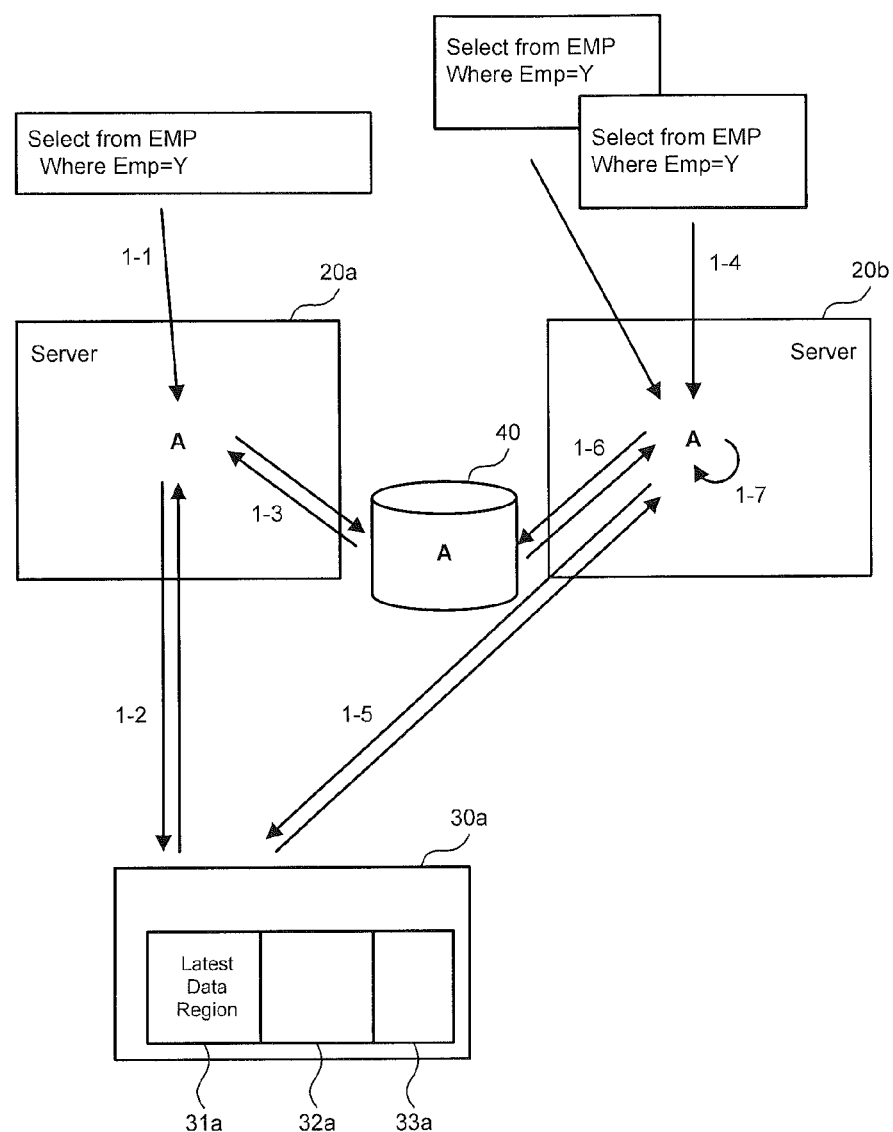
FIG. 2 is an illustration of general operation referencing a page in accordance to one embodiment.

FIG. 2 is an illustration of an embodiment depicting general operation of an embodiment in an example where the operation involves referencing a page. However, in FIG. 2, only the servers 20a, 20b of the servers 20a, 20b, 20c, 20d of FIG. 1 are shown, and the client 10 is omitted. This is done for clarity and improving understanding. Furthermore, an internal storage region is shown for the shared information control device 30a. A latest data region 31a is a cache region for storing the latest data shared by the servers 20a, 20b, which is an example of a storage region shared by the plurality of servers. A lock information region 32a is a storage region that stores the lock information shared by the servers 20a, 20b, and a shared communication region 33a is a storage region that stores meta-information shared by the servers 20a, 20b.

FIG. 2 illustrates an example of the case where page A is referenced using the server 20a and the server 20b. Herein, it is assumed that page A is not held by any of the server 20a, server 20b, and shared information control device 30a. First, an SQL statement is issued to the server 20a, and a record that satisfies the condition Emp=Y is requested (1-1). This requires that page A containing the satisfied record should be acquired. Since the server 20a does not hold page A, it issues a read and registration request to the latest data region 31a of the shared information control device 30a (1-2). Then, the shared information control device 30a registers that the server 20a holds page A in a directory (not shown) in the latest data region 31a. In this case, page A is not cached in the latest data region 31a, so the server 20a acquires page A from the database 40 (1-3).

Subsequently, the same SQL statement is issued to the server 20b (1-4) to acquire page A. Since the server 20b also does not hold page A, it issues a read and registration request to the latest data region 31a of the shared information control device 30a (1-5). Then, the shared information control device 30a registers that the server 20b holds page A in a directory (not shown) in the latest data region 31a. In this case, page A is not cached in the latest data region 31a, so the server 20b acquires page A from the database 40 (1-6). Note that thereafter if the server 20b references page A again, the server 20b can reference page A that is held in the cache (1-7).

Figure 3:
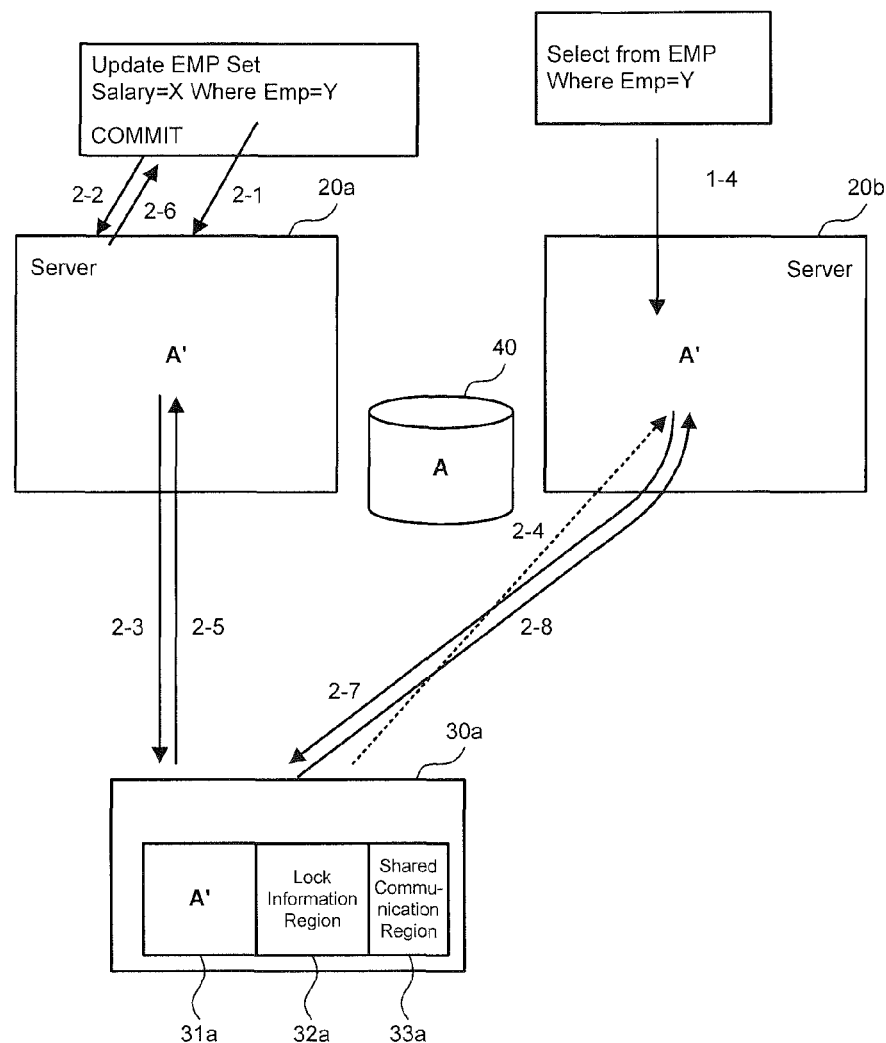
FIG. 3 is an illustration of the general operation during a page update in accordance to one embodiment.

FIG. 3 is an example illustrating general operation in an embodiment where a page is being updated. In FIG. 3, only the servers 20a, 20b of the servers 20a, 20b, 20c, 20d of FIG. 1 are shown, and the client 10 is omitted. Furthermore, similar to FIG. 2, the internal storage region is shown for the shared information control device 30a. In FIG. 3, the operation begins from the state where the operation of FIG. 2 was completed. In other words, at the start of the operation, the latest data region 31a does not hold page A, and the servers 20a, 20b hold page A in their caches.

As shown, an SQL statement is issued to the server 20a, and the server 20a executes an updating process (2-1). Thereby, page A is updated, and becomes page A'. Next, a commitment is issued to the server 20a, and updating of page A is confirmed (2-2). The server 20a issues a write registration request to the latest data region 31a of the shared information control device 30a (2-3). Then, the shared information control device 30a writes page A' to the latest data region 31a. Thereby, the shared information control device 30a invalidates (cross invalidation) the page A held by the server 20b (2-4). Furthermore, at this time, the shared information control device 30a deletes the registration of the server 20b from the directory (not shown) in the latest data region 31a. Furthermore, the shared information control device 30a returns a write registration request response to the server 20a (2-5). Thereby, the server 20a returns to the client 10 (not shown) a response indicating that committing is completed (2-6).

Subsequently, if the server 20b needs page A again, the server 20b issues a new read registration request to the latest data region 31a of the shared information control device 30a (2-7). Then, the shared information control device 30a writes page A' to the server 20b. Furthermore, at the same time, the fact that the server 20b holds page A is registered in the directory (not shown) in the latest data region 31a. In the updating operation of FIG. 3, if a fault occurs in the server 20a before committing is completed, the updating of page A is rolled back. Therefore, even if the same update is performed by the server 20b, there is a possibility that page A will have already been updated by another server 20. Therefore, with the present embodiment, even if one server 20 in the database system goes down, the lock information for the data of transactions being executed will continue to be held, and the same SQL statement will again be issued from the client 10 by the same transaction scope as the transaction that was being executed, using another server 20.

In one embodiment, the operation discussed can be performed in the following manner. First, the client 10 logs the issued SQL statement. The client is enabled to identify each transaction by a transaction ID or the like. In this situation, even if a server 20 in the database system goes down, the lock information for the transaction being executed by the server 20 will be held, and can be shared by all of the servers 20. Since the client 10 has received notice indicating that a fault had occurred in a server 20 (or has been detected in the server 20), a reexecute operation is performed using the SQL statement with the same transaction ID using another server 20. Subsequently, the server 20 that has received the SQL statement processes the SQL statement with the designated transaction ID.

Figure 4:
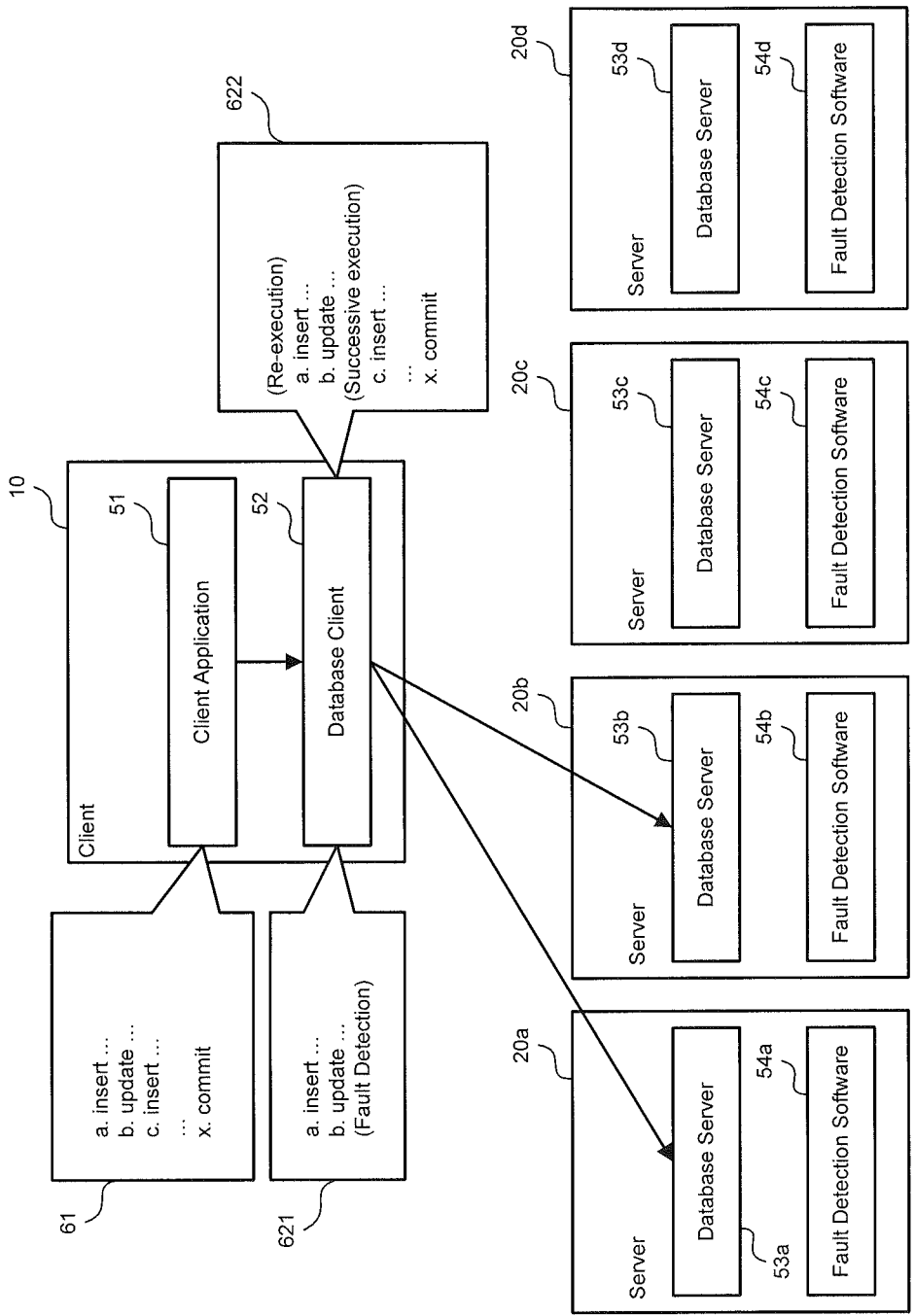
FIG. 4 depicts an exemplary embodiment illustrating a software configuration used by a client in a server environment.

In the embodiment of FIG. 4 a database system that performs the above mentioned steps is described in more detail. In this embodiment, the software configuration of the database system of FIG. 1 can be described using the illustration of FIG. 4. FIG. 4 provides for a software configuration depiction for the client 10 in processing communication with servers 20$a$, 20$b$, 20$c$, 20$d$ as previously discussed in FIG. 1. As illustrated in FIG. 4, the client 10 contains a client application 51 and a database client 52. Furthermore, the servers 20$a$, 20$b$, 20$c$, 20$d$ contain a database server 53$a$ and fault detecting software 54$a$, a database server 53$b$ and fault detecting software 54$b$, a database server 53$c$ and fault detecting software 54$c$, and a database server 53$d$ and fault detecting software 54$d$, respectively. The database servers 53$a$, 53$b$, 53$c$, 53$d$ and provided with fault detecting software 54$a$, 54$b$, 54$c$, 54$d$ as shown. However, when there is no need to individually identify these software, the software is depicted collectively and referred to as database server 53 and fault detecting software 54, respectively.

The client application 51 issues an SQL statement. In this example an SQL statement 61 is issued. The database client 52 acquires a transaction ID, and executes the SQL statement in response to a request from the client application 51. Furthermore, the database client 52 detects faults in the servers 20$a$, 20$b$, 20$c$, 20$d$. In FIG. 4, when the SQL statement 621 is executed for the server 20 $a$, it is determined that a fault has occurred in the server 20$a$. Therefore, the database client 52 connects to another normally operating server 20$b$, and executes the same SQL statement using the same transaction ID. Later, the unexecuted SQL in the SQL statement 61 is executed. In other words, the database client 52 executes an SQL statement 622 for the server 20$b$.

The database server 53 returns a transaction ID to the database client 52 when the transaction starts. Specifically, a next transaction ID is returned when connecting to the database 40 (refer to FIG. 1), or when committing a transaction. Furthermore, the data lock information is shared among all of the database servers 53, and the lock is not released even if a fault occurs. Furthermore, when a transaction ID is designated and a SQL statement is received from the database client 52, the lock information corresponding to the transaction ID is taken over. The database server 53 performs at least the following processes before executing the SQL statement. Namely, if the execution result of the issued SQL statement becomes different because of inconsistent data due to the fault, the database server 53 returns the data to the one at the start of the transaction during which the fault occurred, by an existing recovery process, so that the data consistency is maintained. However, these processes are the minimum required processes, and a recovery process for all of the data that have become inconsistent due to the fault may be performed prior to reissuing all of the SQL statements.

The fault detecting software 54 detects process faults in the database server 53 in the server 20 where the software 54 runs, and hardware faults in the servers 20 other than the server 20 where the software 54 runs. Specifically, the fault detecting software 54 detects the former faults by detecting that there is no processing by the database server 53 in the server 20 where the fault detecting software 54 runs. Furthermore, the fault detecting software 54 detects the latter faults by detecting that a heartbeat from other fault detecting software 54 in the servers 20 other than the server 20 where the fault detecting software 54 runs has stopped. Furthermore, when the fault detecting software 54 detects a fault, it notifies that fact to the other servers 20 and the shared information control device 30, and automatically performs a recovery process.

Figure 5:
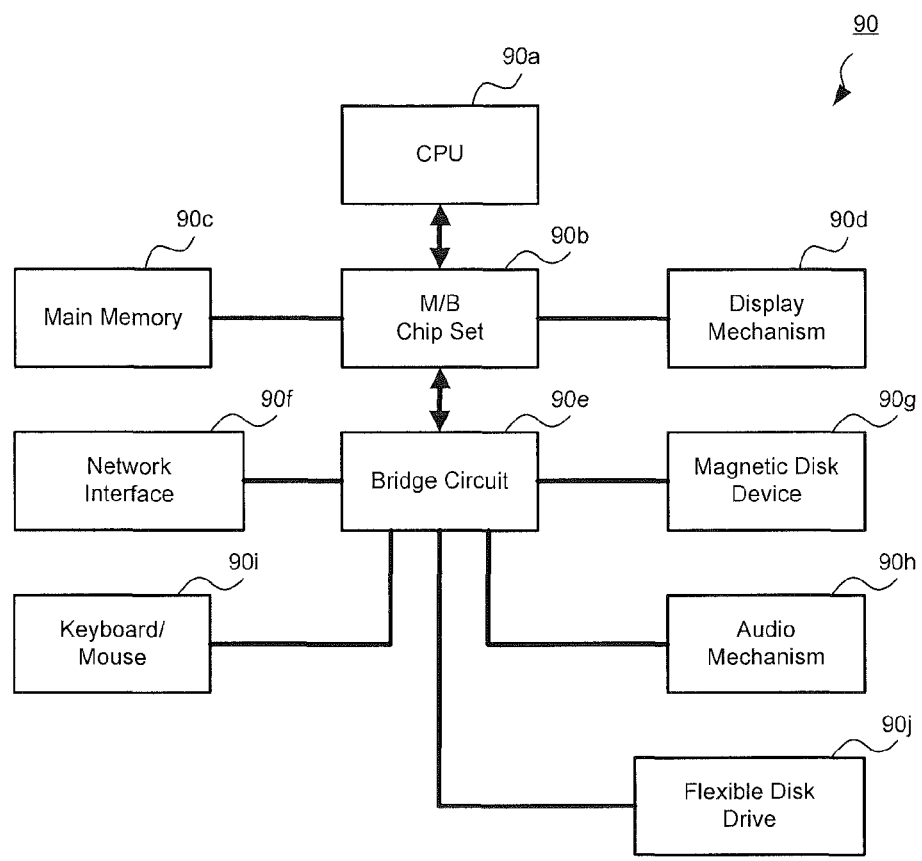
FIG. 5 depicts an exemplary embodiment illustrating an environment with at least one client and several servers.

Subsequently, the hardware configuration of the client 10 and the server 20 are described. Note that the client 10 and the server 20 have the same hardware configuration, so the description will be for the hardware configuration of a computer 90. FIG. 5 is a diagram illustrating an example of the hardware configuration of this type of computer. As illustrated in FIG. 5, the computer 90 is provided with a CPU (central processing unit) 90$a$ that is an operating means, main memory 90$c$ that is connected to the CPU 90$a$ through a M/B (motherboard) chipset 90$b$, and a display mechanism 90$d$ that is also connected to the CPU 90$a$ through the M/B chipset 90$b$. Furthermore, the M/B chipset 90$b$ is connected through a bridge circuit 90$e$ to a network interface 90$f$, a magnetic disk device (HDD) 90$g$, an audio mechanism 90$h$, keyboard/mouse 90$i$, and a flexible disk drive 90$j$.

In FIG. 5, each of the component elements are connected through a bus. For example, the CPU 90$a$ and the M/B chipset 90$b$, as well as the M/B chipset 90$b$ and the main memory 90$c$ are connected through a CPU bus. Furthermore, the M/B chipset 90$b$ and the display mechanism 90$d$ can be connected through an AGP (Accelerated Graphics Port), but if the display mechanism 90$d$ includes a PCI express compatible video card, the M/B chipset 90$b$ and the video card can be connected through a PCI express (PCIe) bus. Furthermore, when connecting to the bridge circuit 90$e$, the PCI express can be used for the network interface 90$f$ for example. Furthermore, serial ATA (AT Attachment), parallel transfer ATA, or PCI (Peripheral Component Interconnect) can be used for example for the magnetic disk device 90$g$. Furthermore, the keyboard/mouse 90$i$ and the flexible disk drive 90$j$ can use USB (Universal Serial Bus).

Figure 6:
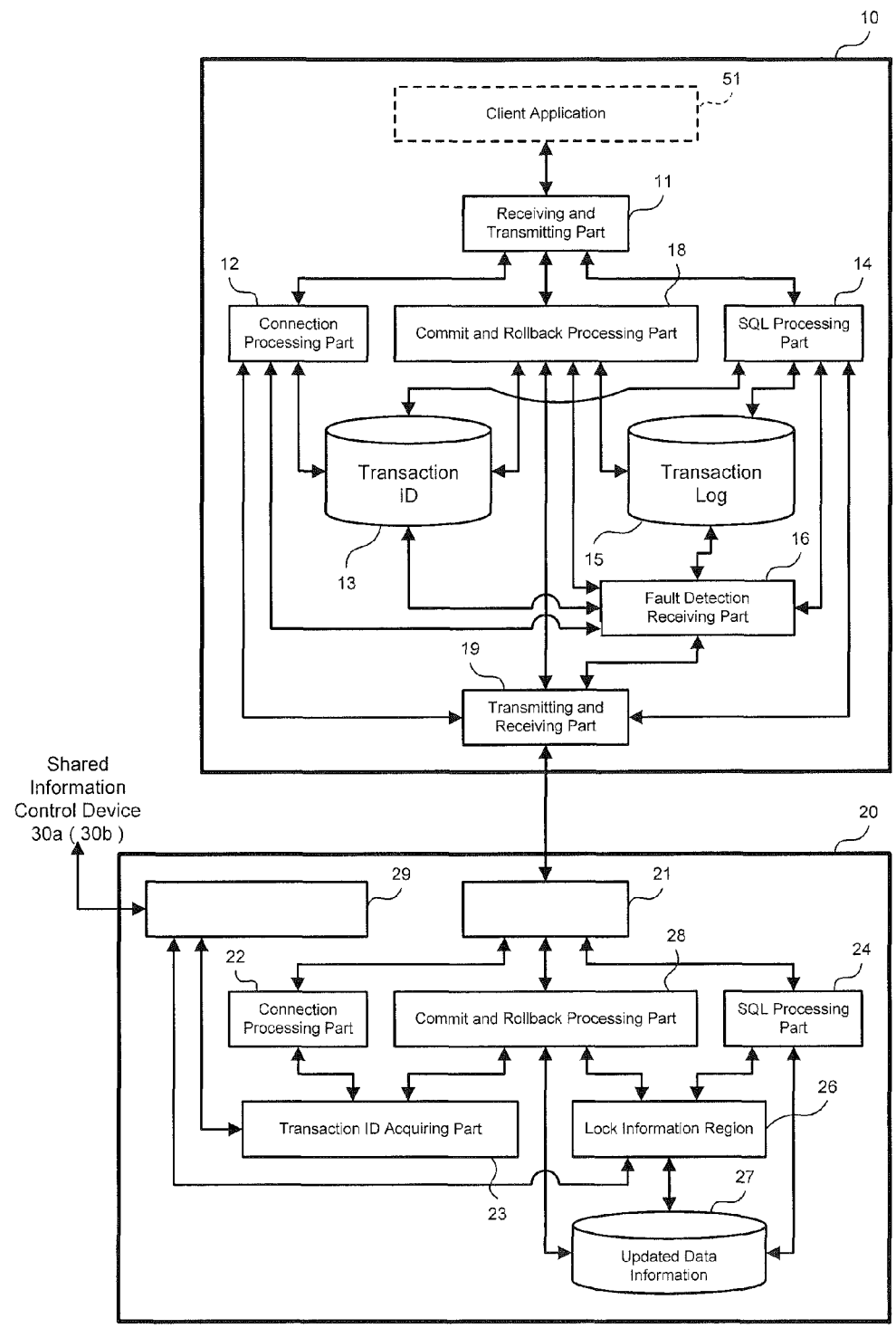
FIG. 6 is an exemplary embodiment illustrating a functional configuration used by client in a multi-server environment.

In FIG. 6, an embodiment is provided where the functions and operations of the client 10 and server 20 are described in conjunction with an alternate embodiment. IN this example, the term "SQL statement" does not include commit statements and rollback statements (hereinafter referred to as "commit statements and the like"). FIG. 6 is a block diagram illustrating an example of a functional configuration of the client 10 and the server 20 where the functions of the client 10 other than the client application 51 are depicted as being provided by the database client 52, and the functions of the server 20 are depicted as being provided by the database server 53. In this embodiment, the client 10 provides a receiving and transmitting part 11, a connection processing part 12, a transaction ID storing part 13, an SQL processing part 14, a transaction log storing part 15, a fault notification receiving part 16, a commit rollback processing part 18, and a transmitting and receiving part 19. The receiving and transmitting component or part 11 receives database connection requests such as the SQL statements, commit statements and the like from the client application 51. It then returns the results after processing is completed. The receiving and transmitting component 11 provides the same interface as the existing technology. The existing client application 51 can be used without modifying this technology. With the existing technology, a plurality of database connections are assigned identifiers known as connection handles when connecting to the database in order to allow the client application 51 to identify the plurality of database connections.

The connection processing component or part 12 instructs the transmitting and receiving part 19 to transmit a database connection request to the database server 53 of the server 20 when the receiving and transmitting part 11 receives the database connection request from the client application 51. Furthermore, the connection processing part 12 stores a connection handle included in a response to the database connection request, the next transaction ID, and an identifier of the database server 53 (such as an IP address) in the transaction ID storing part 13 if a return value showing that the request was properly processed is included in the response when the transmitting and receiving part 19 receives the response from the database server 53. Furthermore, the connection processing component 12 instructs the receiving and transmitting component 11 to transmit a response indicating that the database connection request was properly processed to the client application 51. With the present embodiment, the connection processing part 12 is provided as an example of a recognizing component/part that recognizes the transaction.

Furthermore, if a fault or failure occurs in the server 20 during connection processing, the connection processing component 12 instructs the transmitting and receiving component/part 19 to transmit the database connection request to the database server 53 of another server 20. In this example, the connection processing component/part 12 stores the connection handle and the identifier of the database server 53 in the transaction ID storing component/part 13 if a return value indicating that the request was properly processed is included in a response to the database connection request when the transmitting and receiving component/part 19 receives the response from the database server 53. Then, the connection processing component 12 instructs the receiving and transmitting component 11 to transmit a response indicating that the database connection request was properly processed to the client application 51. Furthermore, the connection processing component 12 requests the fault notification receiving component 16 to connect to another server 20 and successively transmit SQL statements for all transaction IDs that are processed in the database server 53 of the server 20 where the fault occurred, and have processing requesting flags not indicating requests in progress.

The transaction ID storing component 13 stores transaction IDs outputted by the connection processing component 12. The commit and rollback processing component/part 18 handles connections including setting up a connection and subsequent providing of handles such as used by the client application 51. It can also provide actual handle used by the database server 53 after a fault occurs as well as provide identifier for the database server 53. It also provides for the processing requests, requesting flags that indicate whether or not the respective transaction IDs are requesting processing to the database server 53. The transaction ID storing component 13 may hold other information required for the connection as well.

When the receiving and transmitting component 11 receives a connection handle and an SQL statement from the client application 51, the SQL processing component/part 14 stores correspondence with the transaction ID. This is stored, in one embodiment, in the transaction ID storing component 13. The SQL statement is stored in the transaction log storing component/part 15. The issuance orders of the SQL statements for the same transaction ID are also stored. Furthermore, the SQL processing component 14 instructs the transmitting and receiving component 19 to transmit the processing request for the SQL statement to the database server 53. Furthermore, when the transmitting and receiving component 19 receives a response to the SQL statement processing request from the database server 53, the SQL processing component 14 instructs the receiving and transmitting component 11 to transmit a response indicating that the SQL statement processing request was properly processed to the client application 51 if a return value indicating that the request was properly processed is included in the response from the database server 53. With the present embodiment, the SQL processing component 14 is provided as an example of the processing requesting part that requests processing by an SQL statement and the process controlling component that controls processing of the data.

In instances where a failure (or fault) occurs in the server 20 during processing, the SQL processing component 14 instructs the transmitting and receiving component 19 to transmit to the database server 53 of another server 20 a processing request for the first SQL statement corresponding to the same transaction ID that was stored in the transaction log storing component 15. Furthermore, in this case, if a return value indicating that the request was properly processed is included in a response to the processing request for the SQL statement when the transmitting and receiving component 19 receives the response from the database server 53 (and there is an un-transmitted SQL statement in the transaction log storing component 15) the SQL processing component 14 instructs the transmitting and receiving component 19 to transmit a processing request for the next SQL statement to the database server 53. Subsequently, if a return value indicating that the request was properly processed is included in the response but there are no un-transmitted SQL statements in the transaction log storing component 15, the SQL processing part 14 instructs the receiving and transmitting component 11 transmits a response indicating that the processing request for the SQL statement was properly processed to the client application 51. After a failure/fault occurs, connections and transactions will occur with another database server 53, but the connection handle that is used for transactions with the client application 51 will be the same as before the fault occurred. Therefore, the information for both the connection handle used by the client application 51 and the actual handle being used by the database server 53 are stored in the transaction ID storing component 13 if necessary. In this embodiment, the SQL reprocessing component/part 14 is provided as an example of the reprocessing requesting part that requests reprocessing by the SQL statement and the reprocessing controlling component that controls the reprocessing of the data. Furthermore, the SQL processing component 14 requests the fault notification receiving component 16 to connect to another server 20 and successively transmit SQL statements for all transaction IDs that are processed in the database server 53 of the server 20 where the fault occurred, and have processing requesting flags not indicating requests in progress.

The transaction log storing component/part 15 stores correspondence between the transaction ID sent by the SQL processing component 14 and the response to the SQL statement. The transaction log storing component 15 may hold other information required when issuing the SQL statement.

With the present embodiment, the transaction log storing part 15 is provided as an example of a storing component/part that stores the SQL statement. The fault notification receiving component/part 16 receives notification of a fault when a fault in the database server 53 is detected by the fault detecting software 54 or the like. Furthermore, the fault notification receiving component 16 receives a notification of a fault in the database server 53 from the connection processing component 12, the SQL processing component 14, and the commit and rollback processing component 18. Subsequently, the fault notification receiving component 16 performs the following processing for all transaction IDs where a processing requesting flag does not indicate a request in progress. The fault notification receiving component 16 first connects to another server 20 and registers its actual handle to the actual handle of the corresponding transaction ID in the transaction ID storing component 13. Subsequently, the fault notification receiving component 16 instructs the transmitting and receiving component/part 19 to transmit a processing request for a first SQL statement corresponding to that transaction ID to the database server 53 of another server 20. Furthermore, in this case, if a return value indicating that the request was properly processed is included in a response to the processing request for the SQL statement when the transmitting and receiving component 19 receives the response from the database server 53 (and there is an un-transmitted SQL statement in the transaction log storing component 15) the fault notification receiving component 16 instructs the transmitting and receiving component 19 to transmit a processing request for the next SQL statement to the database server 53. In turn, if a return value indicating that the request was properly processed is included in the response but there are no un-transmitted SQL statements in the transaction log storing component 15, the processing related to the transaction ID is terminated.

The commit and rollback processing component 18 instructs the transmitting and receiving component 19 to transmit a commit statement to the database server 53 of the server 20 when the receiving and transmitting component 11 receives a commit statement processing request from the client application 51. Furthermore, if a return value indicating that the request was properly processed is included in a response to the commit statement processing request when the transmitting and receiving component 19 receives the response from the database server 53, the commit and rollback processing part 18 deletes all of the information relating to the current transaction ID from the transaction log storing component 15 and the transaction ID storing component 13, and stores the next transaction ID included in the response in the transaction ID storing component 13. Furthermore, the commit and rollback processing component 18 instructs the receiving and transmitting component 11 to transmit a response indicating that the commit statement processing request was properly processed to the client application 51. In this embodiment, the commit and rollback processing component 18 is provided as an example of the processing requesting component that requests processing by an SQL statement and the processing controlling component that controls the processing of the data.

Furthermore, if a fault occurs in the server 20 during processing, the commit and rollback processing component 18 instructs the transmitting and receiving component 19 to transmit to the database server 53 of another server 20 a processing request for the first SQL statement corresponding to the same transaction ID stored in the transaction log storing part 15. Furthermore, in this case, if a return value indicating that the request was properly processed is included in a response to the processing request for the SQL statement when the transmitting and receiving component 19 receives the response from the database server 53, and there is an un-transmitted SQL statement in the transaction log storing part 15, the commit and rollback processing component 18 instructs the transmitting and receiving part 19 to transmit a processing request for the next SQL statement to the database server 53, and if a return value indicating that the request was properly processed is included in the response but there are no un-transmitted SQL statements in the transaction log storing component 15, the commit and rollback processing component 18 instructs the transmitting and receiving component 19 to transmit a processing request for a commit statement to the database server 53. Furthermore, if a return value indicating that the request was properly processed is included in the response, the commit and rollback processing component 18 deletes all of the information relating to the current transaction ID from the transaction log storing component 15 and the transaction ID storing component 13, and stores the next transaction ID included in the response in the transaction ID storing component 13. Then, the commit and rollback processing component 18 instructs the receiving and transmitting component 11 to transmit a response indicating that the commit statement processing request was properly processed to the client application 51. With the present embodiment, the commit and rollback processing component 18 is provided as an example of the processing requesting component that requests processing by an SQL statement and the processing controlling component that controls the processing of the data. Furthermore, the commit and rollback processing component 18 requests the fault notification receiving component 16 to connect to another server 20 and successively transmit SQL statements for all transaction IDs that are processed in the database server 53 of the server 20 where the fault occurred, and have processing flags that do not indicate the requests in progress.

Furthermore, the commit and rollback processing component/part 18 instructs the transmitting and receiving component 19 to transmit a rollback statement to the database server 53 of the server 20 when the receiving and transmitting component 11 receives a rollback statement processing request from the client application 51. Furthermore, if a return value indicating that the request was properly processed is included in a response to the rollback statement processing request when the transmitting and receiving component 19 receives the from the database server 53, the commit and rollback processing component 18 deletes all of the information relating to the current transaction ID from the transaction log storing component 15 and the transaction ID storing component 13, and stores the next transaction ID included in the response in the transaction ID storing component 13. Then, the commit and rollback processing component 18 instructs the receiving and transmitting component 11 to transmit a response indicating that the rollback statement processing request was properly processed to the client application 51.

When a failure or fault occurs in the server 20 during rollback processing, the commit and rollback processing component 18 instructs the transmitting and receiving component 19 to transmit the rollback statement processing request to the database server 53 of another server 20. Furthermore, in this case, if a return value indicating that the request was properly processed is included in a response to the rollback statement processing request when the transmitting and receiving component 19 receives the response from the database server 53, the commit and rollback processing component 18 deletes all of the information relating to the current transaction ID from the transaction log storing component 15 and the transaction ID storing component 13, and stores the next transaction ID included in the response in the transaction ID storing component 13. Then, the commit and rollback processing component 18 instructs the receiving and transmitting component 11 to transmit a response indicating that the rollback statement processing request was properly processed to the client application 51.

In one embodiment, the commit and rollback processing component 18 is provided as an example of the recognizing component that recognizes a transaction. The transmitting and receiving component 19 transmits a database connection request, a processing request for an SQL statement, and a processing request for a commit statement or the like to the database server 53 of the server 20, and receives a result when processing is completed. The result includes a return value indicating whether or not the request was properly processed, and may include a next transaction ID as an argument.

In one embodiment, the functional components described above are implemented by the cooperation of hardware and software resources. Specifically, in the client 10, the CPU 90a implements these functional components, for example the receiving and transmitting component 11 of the database client 52, connection processing component 12, SQL processing component 14, fault notification and receiving component 16, commit and rollback processing component 18, and transmitting and receiving component 19 by reading corresponding programs from a magnetic disk device 90g to the main memory 90c and executing them. The transaction ID storing component 13 and the transaction log storing component 15 are implemented by the magnetic disk device 90g, for example.

In on embodiment, the server 20 is provided with the receiving and transmitting component 11, the connection processing component 12, the transaction ID acquiring component 23, the SQL processing component 24, the lock information processing component 26, the updated data information storing component/part 27, the commit and rollback processing component 18, and the shared information transmitting and receiving component/part 29. The receiving and transmitting component 21 receives a database connection request, a processing request for an SQL statement, and a processing request for a commit statement or the like from the database client 52, and returns a result when processing is completed.

The connection processing component/part 22 performs connection processing for the database 40 (refer to FIG. 1) when the receiving and transmitting component 21 receives a connection request from the database client 52. Furthermore, the connection processing component 22 makes the transaction ID acquiring component/part 23 acquire a unused transaction ID from the shared information control device 30a, and instructs the receiving and transmitting component/part 21 to transmit the transaction ID to the database client 52.

The transaction ID acquiring component 23 instructs the shared information transmitting and receiving component 29 to transmit a transaction ID acquisition request to the shared information control device 30a in response to a request from the connection processing component 22 or the commit and rollback processing component 28, and returns the transaction ID to the requesting source when the shared information transmitting and receiving component 29 receives the transaction ID from the shared information control device 30a.

The SQL processing component 24 causes the lock information processing component/part 26 to output a hold request for lock information that associates a transaction ID with data to be locked, and stores in the updated data information storing component/part 27 updated data information that associates content updated by an SQL statement with information indicating whether the update was confirmed, when the receiving and transmitting component 21 receives a processing request for the SQL statement from the database client 52. Then, the SQL processing component 24 instructs the receiving and transmitting component 21 to transmit a response to the processing request for the SQL statement to the database client 52. With the present embodiment, the SQL processing component/part 24 is provided as an example of the processing component that processes data and the reprocessing component that reprocesses the data.

The lock information processing component 26 instructs the shared information transmitting and receiving component 29 to transmit to the shared information control device 30a a hold request for the lock information that associates a transaction ID with data to be locked, in response to a request from the SQL processing component 24, and when the shared information transmitting and receiving component 29 and when the shared information transmitting and receiving component 29 receives a notification from the shared information control device 30a that it holds the lock information, the lock information processing component 26 notifies it to the SQL processing component 24. Furthermore, the lock information processing component 26 instructs the shared information transmitting and receiving component 29 to transmit to the shared information control device 30a a delete request for the lock information corresponding to the transaction ID, in response to a request from the commit and rollback processing component 28, and when the shared information transmitting and receiving component 92 receives a notification from the shared information control device 30a that it deleted the lock information, the lock information processing component 26 notifies it to the commit and rollback processing component 24.

The updated data information storing component 27 stores the updated data information that associates content updated by the SQL statement transmitted by the SQL processing component 24 with information indicating whether the update was confirmed. With the present embodiment, the updated information is used as an example of updated information indicating content of data updated by the SQL statement.

The commit and rollback processing component 28 outputs a request to delete the lock information corresponding to the transaction ID included in the processing request for the commit statement when the receiving and transmitting component 21 receives the processing request for the commit statement from the database client 52, and confirms the updated data information corresponding to the commit statement. Furthermore, the commit and rollback processing component 28 cancels all of the data updates in the transaction and outputs a request to delete the lock information corresponding to the transaction ID included in the processing request for the rollback statement, when the receiving and transmitting component 21 receives the processing request for the rollback statement from the database client 52.

The shared information transmitting and receiving component 29 transmit requests from the transaction ID acquiring component 23 and the lock information processing component 26 to the shared information control device 30a, and receives results. In one embodiment, these functional components are implemented by the cooperation of hardware and software resources. Specifically, in the server 20, the CPU 90a implements these functional components, for example the receiving and transmitting component 21 of the database server 53, the connection processing component 22, the transaction ID acquiring component 23, the SQL processing component 24, the lock information processing component 26, the commit and rollback processing component 28, and the shared information transmitting and receiving component 29 by reading corresponding programs from the magnetic disk device 90g to the main memory 90c, and executing them. The updated data information storing component 27 is implemented, for example, by the magnetic disk device 90g.

Figure 7:
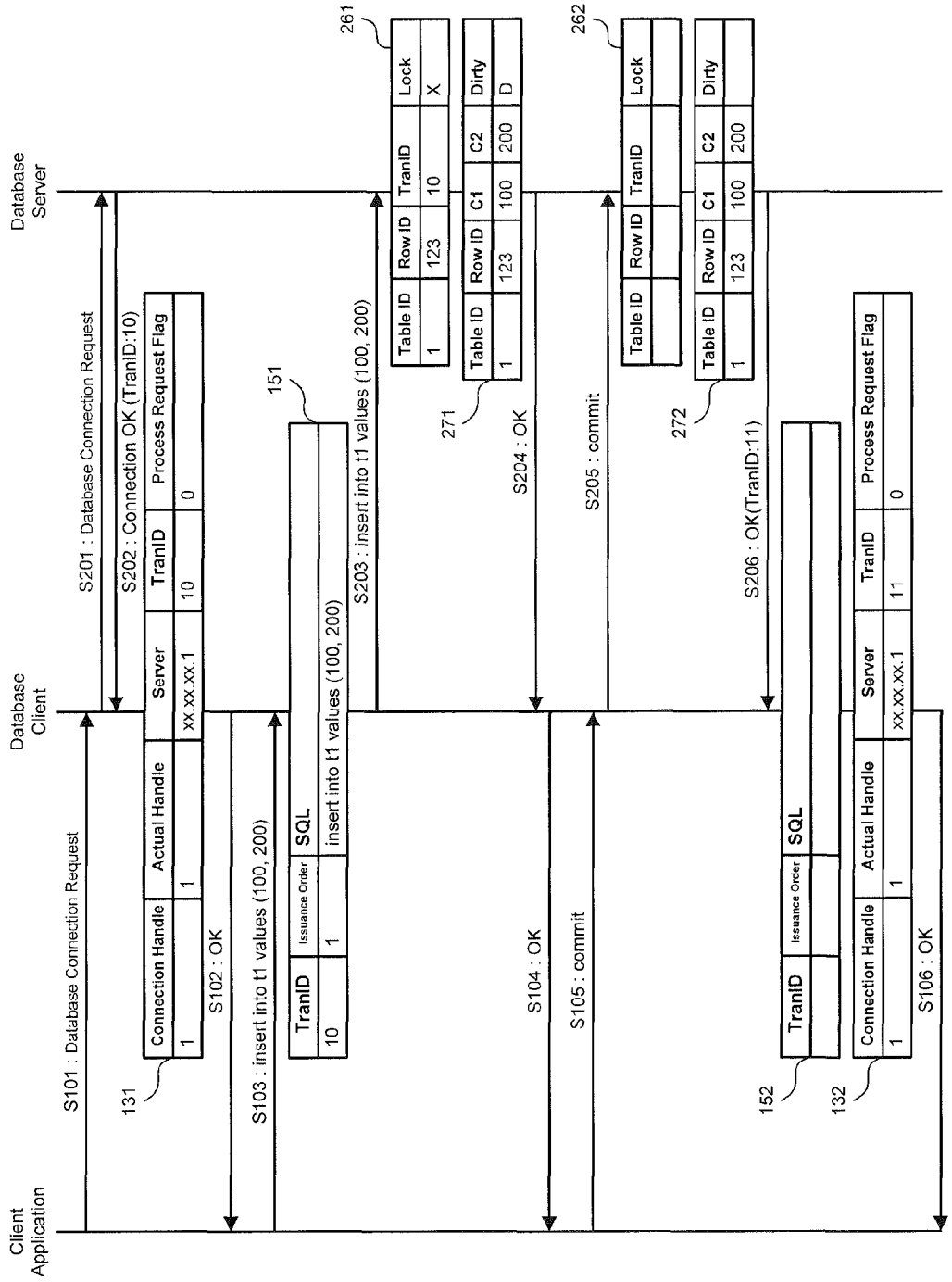
FIG. 7 is an illustration of a sequence diagram for a process flow between a client application, database client, and database server, according to one embodiment.

FIG. 7 depicts a sequence diagram example and a process flow between a client application 51, database client 52, and database server 53a. Herein, the case where a fault does not occur in the server 20a is described. In this case, the client application 51 transmits a database connection request to the database client 52 (step 101). Subsequently, the database client 52 transmits the database connection request to the database server 52 (step 201). Specifically, the receiving and transmitting component 11 receives the database connection request from the client application 51, the connection processing component 12 instructs the transmitting and receiving component 19 to transmit the database connection request, and the transmitting and receiving component 19 transmits the database connection request to the database server 53a.

The database server 53a transmits to the database client 52 a response "connection OK" including a transaction ID "10" (step 202). Specifically, the receiving and transmitting component 21 receives the database connection request, and the connection processing component 22 acquires the transaction ID "10" from the transaction ID acquiring component 23 while processing the connection to the database 40, and instructs the receiving and transmitting component 21 to transmit a response that includes the transaction ID "10" and "connection OK" indicating that the database connection request was properly processed, and the receiving and transmitting component 21 transmits the response to the database client 52. Subsequently, the database client 52 transmits the "OK" response together with a connection handle obtained by the existing technology to the client application 51 (step 102). At this time, the database client 52 holds the transaction ID "10", the connection handle and other information, as shown in the transaction ID information 131. Specifically, the transmitting and receiving component 19 receives the response to the database connection request from the database server 53a, the connection processing component 12 stores the transaction ID "10", the connection handle, the actual handle (same as the connection handle), the identifier of the database server 53a, and the initial value of the processing requesting flag ("0" indicating that there are no requests in progress), which are included in the response, to the transaction ID storing component 13, and instructs the receiving and transmitting component 11 to transmit a response of "OK" indicating that the request was properly processed, and the receiving and transmitting component 11 transmits the response to the client application 51.

Next, it is assumed that the client application 51 transmits the SQL statement "insert into t1 values (100, 200)" to the database client 52 (step 103). Then, the database client 52 holds the SQL statement in the row of the transaction ID "10" and the issuance order "1", as shown in the transaction log 151. Thereafter, the database client 52 transmits the processing request "insert into t1 values (100, 200)" to the database server 53a (step 203). Specifically, the receiving and transmitting component 11 receives the SQL statement from the client application 51, the SQL processing component 14 sets the processing requesting flag of that transaction ID in the transaction ID storing component 13 to "1" indicating a request in progress, stores in the transaction log storing component 15 the transaction ID stored in the transaction ID storing component 13 in association with the received SQL statement, and instructs the transmitting and receiving component 19 to transmit a processing request for the SQL statement, and the transmitting and receiving component 19 transmits the processing request for the SQL statement to the database server 53a.

In this embodiment, the database server 53a causes the shared information control device 30a (refer to FIG. 1) to maintain the lock information 261, while the database server itself maintains the updated data information 271. In the lock information and the updated data information, table ID "1" indicates table "t1" of the SQL statement, and row ID "123" indicates a row where "values (100, 200)" in the SQL statement is inserted. "X" in the "Lock" column of the lock information indicates that an exclusive lock has been applied, and "D" in the "Dirty" column of the updated data information indicates that the corresponding update is not committed. The database server 53 transmits the response "OK" to the database client 52 (step 204). Specifically, the receiving and transmitting component 21 receives the SQL statement processing request, the SQL processing component 24 outputs to the shared information control device 30a a request to maintain the lock information 261 by the lock information processing component 26, stores the updated data information 271 in the updated data information storing component 27, and instructs the receiving and transmitting component 21 to transmit the response "OK" indicating that the request was properly processed, and the receiving and transmitting component 21 transmits the response to the database client 52.

Subsequently, the database client 52 transmits an "OK" response to the client application 51 (step 104). Specifically, the transmitting and receiving component 19 receives a response to the SQL statement processing request, the SQL processing component 14 instructs the receiving and transmitting component 11 to transmit an "OK" response indicating that the request was properly processed, the receiving and transmitting component 11 transmits the response to the client application 51, and the SQL processing component 14 sets the processing requesting flag of the transaction ID in the transaction ID storing component 13 to "0".

The client application 51 transmits the commit statement to the database client 52 (step 105). Then, the database client 52 transmits the commit statement processing request to the database server 52 (step 205). Specifically, the receiving and transmitting component 11 receives the commit statement from the client application 51, the commit and rollback processing component 18 instructs the transmitting and receiving component 19 to transmit a processing request for the commit statement, and sets the processing requesting flag of the transaction ID in the transaction ID storing component 13a to "1", and the transmitting and receiving component 19 transmits the processing request for the commit statement to the database server 53a.

In this embodiment, the database server 53a itself confirms the updated data information 272. Furthermore, the shared information control device 30a (refer to FIG. 1) releases the lock information 261 of the transaction, leading to the status of the lock information 262. Then, the response of "OK" including the next transaction ID "11" is transmitted to the database client 52 (step 206). Specifically, the transmitting and receiving component 21 receives the commit statement processing request, the commit and rollback processing component 28 confirms the updated data information 271 stored in the updated data information storing component 27, outputs to the shared information control device 30 the release request for the lock information 261 by the lock information control component 261, and instructs the receiving and transmitting component 21 to transmit a response including the next transaction ID "11" and "OK" indicating that the request was properly processed, and the receiving and transmitting component 21 transmits the response to the database client 52.

The database client 52 then deletes the retained SQL statement as shown in the transaction log 152, and retains the transaction ID "11" as shown in the transaction ID information 132. Furthermore, the database client 52 transmits an "OK" response to the client application 51 (step 106). Specifically, the transmitting and receiving component 19 receives a response to the commit statement processing request, the commit and rollback processing component 18 deletes the SQL statement corresponding to the designated transaction ID in the transaction log storing component 15, stores the transaction ID "11" included in the response in the transaction ID storing component 13, and instructs the receiving and transmitting component 11 to transmit a response of "OK" indicating that the commit statement processing request was properly processed, the receiving and transmitting component 11 transmits the response to the client application 51, and the commit and rollback processing component 18 sets the processing requesting flag of the corresponding transaction ID in the transaction ID storing component 13 to "0".

Figure 8:
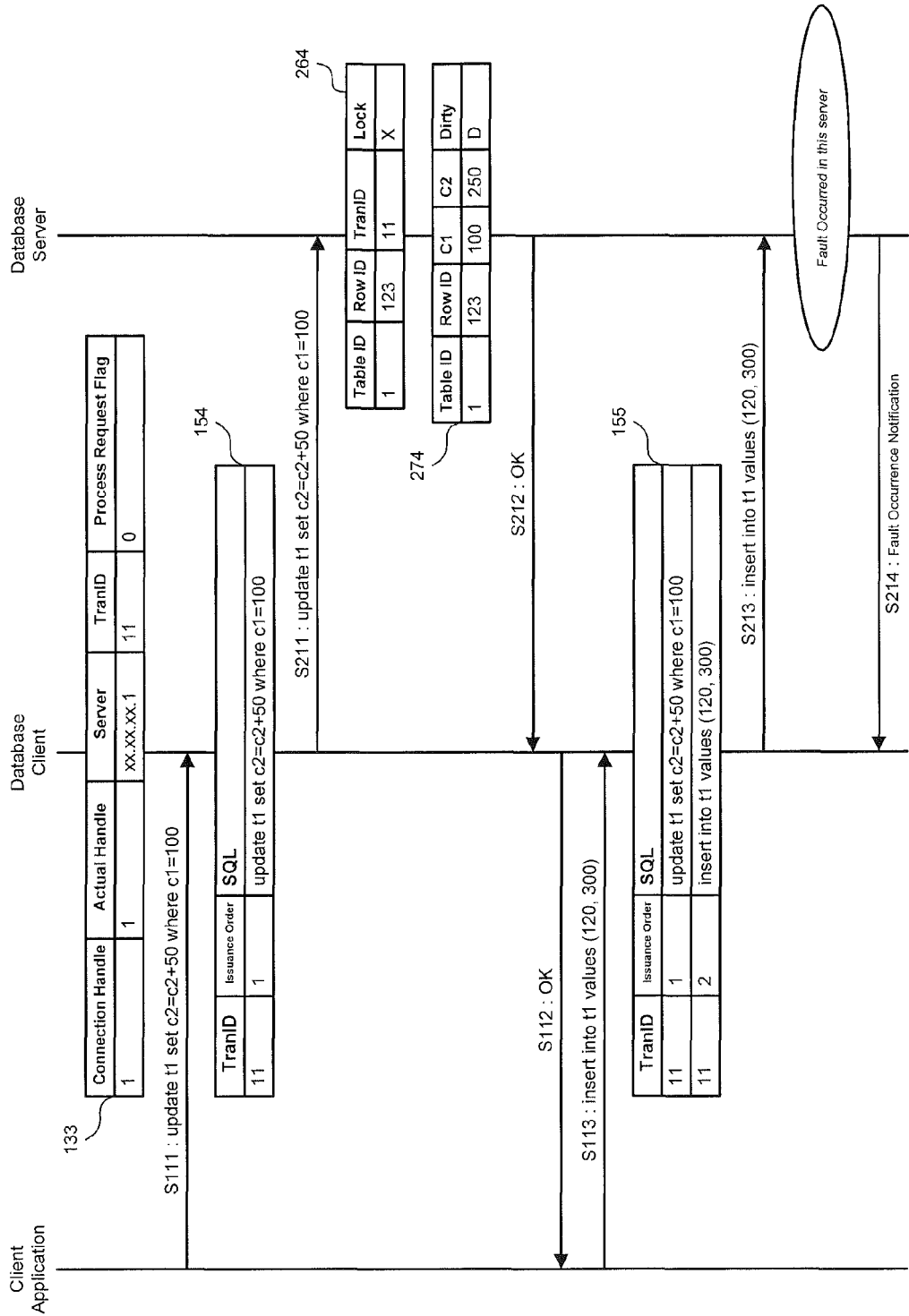
FIG. 8 is an illustration of a sequence diagram for a process flow between a client application, database client, and database server, in accordance to an alternate embodiment.

FIG. 8 depicts a sequence diagram example and a process flow between the client application 51, the database client 52, and the database server 53a. Herein, the case where a fault occurs in the server 20a is described. The flow of the process of FIG. 8 assumes that the flow of the process of FIG. 7 has been performed, and therefore at the start of processing, the database client 52 retains the transaction ID "11" as shown in the transaction ID information 133. First, it is assumed that the client application 51 transmits the SQL statement "update t1 set c2=C2+50 where c1=100" to the database client 52. Then, the database client 52 retains the SQL statement in the row of the transaction ID "11" and the issuance order "1" as shown in the transaction log 154, and transmits the processing request for the SQL statement "update t1 set c2=C2+50 where c1=100" to the database server 53a (step 211). Specifically, the receiving and transmitting component 11 receives the SQL statement from the client application 51, the SQL processing component 14 sets the processing requesting flag of the corresponding transaction ID in the transaction ID storing component 13 to "1", stores the transaction ID stored in the transaction ID storing component 13 in the transaction log storing component 15 in association with the received SQL statement, and instructs the transmitting and receiving component 19 to transmit the processing request for the SQL statement, and the transmitting and receiving component 19 transmits the processing request for the SQL statement to the database server 53a.

The database server 53a causes the shared information control device 30a (refer to FIG. 1) to retain the lock information 264, while the database server itself retains the updated data information 274. Then, the database server 53a transmits a response "OK" to the database client 52 (step 212). Specifically, the receiving and transmitting component 21 receives the SQL statement processing request, the SQL processing component 24 outputs to the shared information control device 30a a request to retain the lock information 264 by the lock information processing component 26, stores the updated data information 274 in the updated data information storing component 27, and instructs the receiving and transmitting component 21 to transmit the response "OK" indicating that the request was properly processed, and the receiving and transmitting component 21 transmits the response to the database client 52.

The database client 52 then transmits an "OK" response to the client application 51 (step 112). Specifically, the transmitting and receiving component 19 receives a response to the SQL statement processing request, the SQL processing component 14 instructs the receiving and transmitting component 11 to transmit a response of "OK" indicating that the request was properly processed, the receiving and transmitting component 11 transmits the response to the client application 51, and the SQL processing component 14 sets the processing requesting flag of the corresponding transaction ID in the transaction ID storing component 13 to "0".

Subsequently, it is assumed that the client application 51 transmits the SQL statement "insert into t1 values (120, 300)" to the database client 52 (step 113). Then, the database client 52 retains the SQL statement in the row of the transaction ID "11" and the issuance order "2" as shown in the transaction log 155, and transmits the SQL statement processing request to the database server 53a (step 213). Specifically, the receiving and transmitting component 11 receives the SQL statement from the client application 51, the SQL processing component 14 sets the processing requesting flag of the corresponding transaction ID in the transaction ID storing component 13 to "1", stores the transaction ID stored in the transaction ID storing component 13 in the transaction log storing component 15 in association with the received SQL statement, and instructs the transmitting and receiving component 19 to transmit a processing request for the SQL statement, and the transmitting and receiving component 19 transmits the processing request for the SQL statement to the database server 53a.

The fault in this example is assumed to have occurred in the server 20a in which the database server 53a is operating. Then, the database server 53a notifies the database client 52 of the fault occurrence (step 214). However, there are cases when the database server 53a cannot notify of the fault occurrence in the server 20a, such as when a hardware fault occurs in the server 20a. In such cases, the fault detection software 54 that operates in a server 20 other than the server 20a can detect the fault occurrence in the server 20a by the interruption of heartbeats from the fault detection software 54a operating in the server 20a, and therefore the former fault detection software 54 can notify the database client 52 of the fault occurrence.

Figure 9:
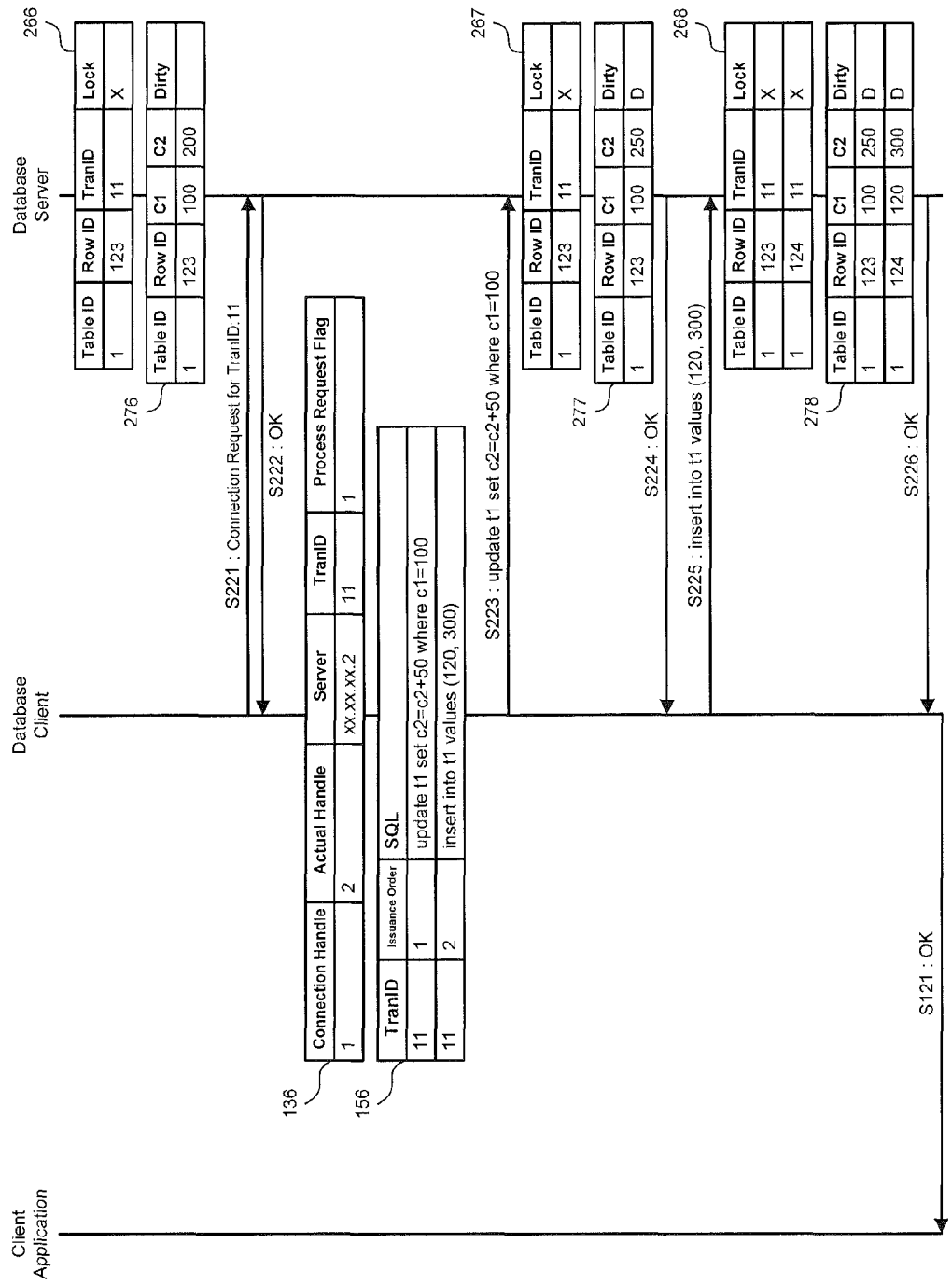
FIG. 9 is an illustration of a sequence diagram for a process flow between a client application, database client, and database server, in accordance to yet another embodiment.

FIG. 9 depicts an example of a sequence diagram and a process flow between the client application 51, the database client 52, and the database server 53b. Herein, because a fault occurs in the server 20a, the case where the server 20b is connected is illustrated. First, note that the fault occurrence is reported in step 214 of FIG. 8, but as illustrated in the lock information 266, the shared information control device 30a (refer to FIG. 1) still retains the lock information 264 of FIG. 8. Furthermore, when only the server 20a retains unconfirmed updated data information, processing of the unconfirmed updated information is not necessary because the information is lost due to the fault in the server 20a, but when the server 20b also retains unconfirmed updated data information, execution of a predetermined process is required. The situation where the server 20b retains the unconfirmed updated data information may result from the server 20b caching the page that includes the unconfirmed updated data, for example. In such a case, the server 20b retains the updated data information 267 (same as the updated data information 272 of FIG. 7) which is the updated data information that was previously committed by performing the restoring process.

Note that the function performing the restoring process is an example of a restoring component restoring the updated information to the state before the transaction is initiated.

In instances where the fault occurrence is reported, the database client 52 transmits the connection request with the transaction ID "11" to the database server 53b (step 221). Specifically, the transmitting and receiving component 19 receives the fault occurrence notification from the data base server 53a, for example, the connection processing component 12 acquires the transaction ID "11" from the transaction ID storing component 13, and instructs transmission of the connection request with the transaction ID "11" to the transmitting and receiving component 19, and the transmitting and receiving component 19 transmits the connection request with the transaction ID "11" to the database server 53b.

The database server 53b transmits the "OK" response to the database client 52 (step 222). Specifically, the receiving and transmitting component 21 receives the connection request, the connection processing component 22 instructs the receiving and transmitting component 21 to transmit the "OK" response, which indicates that the request has been processed normally, and the receiving and transmitting component 21 transmits the response to the database client 52.

The database client 52 then updates the actual handle for the corresponding transaction ID stored in the transaction ID storing component 13 and the identification of the connected database servers 53, and sequentially issues the SQL statements corresponding to the retained transaction ID "11", as shown in the transaction log 156. Namely, the database client 52 transmits the processing request for the SQL statement "update t1 set c2=c2+50 where c1+100" to the database server 53b (step 223). Specifically, the SQL processing component 14 reads the SQL statement having the issuance order "1" and the transaction ID "11" from the transaction log storing component 15, and instructs the transmitting and receiving component 19 to transmit the processing request for the SQL statement, and the transmitting and receiving component 19 transmits the processing request for the SQL statement to the database server 53b.

In this embodiment, the database server 53b causes the shared information control device 30a (refer to FIG. 1) to retain the lock information 267, while the database server itself retains the updated data information 277, and transmits the response "OK" to the database client 52 (step 224). Specifically, the receiving and transmitting component 21 receives the SQL statement processing request, the SQL processing component 24 outputs to the shared information control device 30a a request to retain the lock information 267 by the lock information processing component 26, stores the updated data information 277 in the updated data information storing component 27, and instructs the receiving and transmitting component 21 to transmit the response "OK" indicating that the request was properly processed, and the receiving and transmitting component 21 transmits the response to the database client 52. Note that the shared information control device 30a that received the retaining request for the lock information 267 retains the lock information 266 having the same contents as the lock information 267, so no processing is performed in particular.

Furthermore, the database client 52 transmits the processing request for the SQL statement "insert into t1 values (120, 130)" to the database server 53b (step 225). Specifically, the SQL processing component 14 reads the SQL statement having the issuance order "2" and the transaction ID "11" from the transaction log storing component 15, and instructs transmission of a processing request for the SQL statement to the transmitting and receiving component 19p, and the transmitting and receiving component 19 transmits the processing request for the SQL statement to the database server 53b.

The database server 53b causes the shared information control device 30a (refer to FIG. 1) to retain the lock information 268, while the database server itself retains the updated data information 278, and transmits the response "OK" to the database client 52 (step 226). Specifically, the receiving and transmitting component 21 receives the SQL statement processing request, the SQL processing component 24 outputs to the shared information control device 30a a request to retain the lock information 268 by the lock information processing component 26, stores the updated data information 278 in the updated data information storing component 27, and instructs the receiving and transmitting component 21 to transmit the response "OK" indicating that the request was properly processed, and the receiving and transmitting component 21 transmits the response to the database client 52.

The database client 52 then transmits an "OK" response to the client application 51 (step 121). Specifically, the receiving and transmitting component 19 receives the response to the processing request for the SQL statement from the database server 53, and the SQL processing component 14 confirms that no unprocessed SQL statement corresponding to the transaction ID "11" is stored in the transaction log storing component 15, and instructs the receiving and transmitting component 11 to transmit the "OK" response, which indicates that the request has been processed normally, the receiving and transmitting component 11 transmits the response to the client application 51, and the SQL processing component 14 sets the processing requesting flag of the corresponding transaction ID in the transaction ID storing component 13 to "0".

As described above, in one embodiment, the database client 52 logs the SQL statement issued by the client application 51, and when the server 20a goes down during processing with a certain transaction ID, the database client 52 re-executes the logged SQL statement with the same transaction ID while retaining the lock information corresponding to that transaction ID in a state where the information can be shared with another server 20. Thereby, the continuation of execution of the SQL statement issued by the client application 51 becomes possible without the client application 51 knowing that there is a fault in the database 40.

The present invention can be implemented completely by the hardware, or can be implemented completely by the software as can be appreciated by those skilled in the art in different embodiments. For example, in on embodiment it is also possible to implement the invention by both the hardware and the software. Furthermore, the present invention can be implemented as a computer, a data processing system, or a computer program. The computer program can be provided by storing it in a medium readable by a computer. Herein, an electronic type, a magnetic type, an optical type, an electromagnetic type, an infrared or semiconductor system (device or equipment), or a transmission type medium can be considered for the medium. Furthermore, a semiconductor, a solid state storage device, a magnetic tape, a readable computer diskette, a random access memory (RAM), a read only memory (ROM), a rigid magnetic disk, and an optical disk are examples of the medium readable by a computer. At the present time, the example of the optical disk includes a compact disk read only memory (CD-ROM), a compact disk read/write (CD-R/W), and a DVD.

Some embodiments were described above using SQL as an example and other limited other examples to provide clarity of explanation. As can be appreciated by those skilled in the art, however, the technical scope of the present invention is not restricted to the above mentioned examples and embodiments and these were only provided to ease understanding. The fact that various modifications can be made, as well as adoption of alternative embodiments, without deviating from the spirit and scope of the present invention will be clear to persons skilled in the art.

What is claimed is:

1. A system for data handling comprising:
a plurality of computer servers configured to perform data processing;
a client in processing communication with the computer servers and enabled to request data processing from any of the servers;
a storing component included in the client for storing information relating to requested data to be processed;
a processing component included in each computer server for applying a control lock to data being processed; and
a reprocessing request component included in the client for enabling a new server to take over processing of requested data upon failure of previously processing computer server, wherein the new computer server obtains information relating to requested data from storing component and information relating to control lock information from the processing component such that the new computer server commences processing at a processing point exactly prior to the failure.

2. The system of claim 1, wherein the storing component includes structured query language (SQL) statements generated by the client that is to be received by the processing for data processing.

3. The system of claim 2, wherein the SQL statement is received from an application running on the client, further comprising:
a processing request component included in the client for generating a specific transaction associated with the SQL statement to be sent to any of the servers processing the data.

4. The system of claim 3, wherein the control lock is applied to data by the specific transaction in response to request from the processing requesting component further comprising:
a reprocessing component provided in each server for reprocessing data in response to the request from the reprocessing requesting component after the control lock is applied.

5. The system according to claim 4, further comprising:
a recognizing component for recognizing the specific transaction associated with a SQL transaction commitment statement requested from any one of the computer servers; and
a recovery component included in the client for recovering updated information after server failure.

6. The system according to claim 5, wherein processing information is updated via the SQL statement.

7. The system according to claim 6, further comprising a shared information control device in processing with the computer servers such that the computer servers can access control lock information associated with processing data.

8. A method of performing data processing comprising:
requesting data processing by a processor via a client relating to a particular operation;
a processing computer server receiving the data processing request;
generating an SQL statement relating to the data to be processed by the operation;
storing by a processor the generated SQL statement;
processing the SQL statement as a specific transaction in the processing server; and
applying a lock by the processing server to the data used by the SQL statement such that data can be retrieved in case of server failure prior to processing completion of the operation.

9. The method of claim 8, further comprising determining occurrence of the failure in the processing server prior to operation completion; and the client transferring processing operation to a new server.

10. The system according to claim 8, wherein the SQL statement is received from an application running on the client.

11. The method of claim 10, wherein the SQL statement and any data related to the associated specific transaction for the SQL statement is stored in a predetermined location prior to operation completion and/or prior to occurrence of any failure.

12. The method of claim 11, wherein the client generates a reprocessing request for the new server to continue processing of operation at the point exactly prior to failure occurring and the new client retrieves the SQL statement and the associated specific transaction data in order to perform the reprocessing.

13. The method of claim 8, wherein the client receives identifying information that identifies a next transaction from one server, further comprising:
the client storing the identifying information and an SQL statement that relates to processing data in a predetermined storage location such that the identifying information is being associated with the SQL statement;
the client transmitting the identifying information and a request for processing the SQL statement to the one server; and
the server processing the data in a state where a lock information is provided associated with the data being processed.

14. The method of claim 13, wherein each server can access the identifying information and information showing that a lock has been applied to the data.

15. The method of claim 14, wherein the storage location wherein the lock information and the SQL statement is stored and shared by all the servers.

16. The method of claim 15, wherein in event of a failure the new server receives the reprocessing request from the client.

17. The method of claim 16, wherein the servers obtain identifying information and the lock information from the shared storage location upon receiving a reprocessing request from the client.

18. The method of claim 17, wherein the identifying information is provided in a response to a commit request for a transaction transmitted to the any server.

19. The method of claim 18, wherein the identifying information is provided in a response to a connection request to the data transmitted to any server.

20. A computer program product for data processing, the computer program product comprising:
a non-transitory computer readable storage medium having program code embodied therewith, the program code executable by a computer to:
request data processing via a client relating to a particular operation;
receive the data processing request by a server;
generate an SQL statement relating to the data to be processed by the operation;

store the generated SQL statement in a predetermined location;
process the SQL statement as a specific transaction in the processing server;
apply a lock by the processing server to the data used by the SQL statement such that data can be retrieved in case of server failure prior to processing completion of the operation.

* * * * *